(12) United States Patent
Xia et al.

(10) Patent No.: US 11,508,983 B2
(45) Date of Patent: Nov. 22, 2022

(54) AUTOMATED BATCH SAMPLE PREPARATION METHOD FOR BUTTON BATTERY

(71) Applicants: SHENZHEN KEJING STAR TECHNOLOGY COMPANY, Guangdong (CN); MTI CORPORATION, Richmond, CA (US)

(72) Inventors: Li Xia, Guangdong (CN); Baofei Lao, Guangdong (CN); Yue Deng, Guangdong (CN); Youxiang Wu, Guangdong (CN)

(73) Assignees: SHENZHEN KEJING STAR TECHNOLOGY COMPANY, Shenzhen (CN); MTI CORPORATION, Richmond, CA (US)

( * ) Notice: Subject to any disclaimer, the term of this patent is extended or adjusted under 35 U.S.C. 154(b) by 409 days.

(21) Appl. No.: 16/896,302

(22) Filed: Jun. 9, 2020

(65) Prior Publication Data
US 2021/0083314 A1    Mar. 18, 2021

(30) Foreign Application Priority Data
Sep. 12, 2019 (CN) .................. 201910865725.X (51) Int. Cl.
*H01M 50/00* (2021.01)
*H01M 10/04* (2006.01)
(Continued)

(52) U.S. Cl.
CPC ..... *H01M 10/0427* (2013.01); *H01M 50/256* (2021.01); *H01M 50/636* (2021.01)

(58) Field of Classification Search
CPC . Y02P 70/50; H01M 10/0427; H01M 50/636; H01M 50/256; H01M 50/609
See application file for complete search history.

(56) References Cited

U.S. PATENT DOCUMENTS

2011/0106280 A1* 5/2011 Zeier .................... H01M 10/42
  700/90
2013/0330601 A1* 12/2013 Mizuta ................ H01M 50/167
  429/174

FOREIGN PATENT DOCUMENTS

CN  201590456 U  9/2010
CN  109860505 A  6/2019

* cited by examiner

*Primary Examiner* — Cynthia H Kelly
*Assistant Examiner* — Monique M Wills (57) ABSTRACT

The invention provides an automated batch sample preparation method for button battery, comprising the following steps: preparing an electrolyte and elements of different specifications, presetting an injection amount of a liquid injection component, scanning and recording the identification information of the elements by a scanning component, grabbing the elements onto a sealing component, injecting the electrolyte into the elements on the sealing component, sealing the elements as a button battery by the sealing component, removing the button battery, then repeat the above steps. The automated batch sample preparation method for button battery provided by the invention has the advantages of high automation degree, simple operation, high-precision assembly and high efficiency. The injection amount can be adjusted and controlled, and button batteries with different specifications can be produced in batch. The information recorded by the scanning component can facilitate the optimization of the process.

10 Claims, 4 Drawing Sheets

(51) Int. Cl.
*H01M 50/256* (2021.01)
*H01M 50/636* (2021.01)

AUTOMATED BATCH SAMPLE PREPARATION METHOD FOR BUTTON BATTERY

CROSS-REFERENCE TO RELATED APPLICATION

This application claims priority to and benefits of Chinese Patent Application No. 201910865725.X, filed on Sep. 12, 2019, and the entire content of which is incorporated herein by reference.

TECHNICAL FIELD

The invention belongs to the technical field of battery production, in particular to an automated batch sample preparation method for button battery.

BACKGROUND

Button battery, also known as button cell, refers to a battery with an overall size of a small button. It is generally used as a backup power supply for various electronic products, such as computer mainboard, electronic watch, electronic dictionary, electronic scale, remote controller, electric toy, cardiac pacemaker, electronic hearing aid, counter and camera.

In the prior art, the button battery is generally assembled according to the order of anode shell, anode piece, electrolyte, separator, electrolyte, cathode piece and cathode shell, the assembled button battery are of the same specification, button battery samples of different specifications cannot be obtained for sample comparison to optimize the assembly process of button battery.

SUMMARY OF THE INVENTION

The invention provides an automated batch sample preparation method for button battery, which aims to solve the technical problem that button batteries with different specifications cannot be assembled in batch in the prior Art.

In order to achieve the above purpose, the technical solution adopted by the invention is to provide an automated batch sample preparation method for button battery, which comprises the following steps:

preparing an electrolyte and a plurality of elements of different specifications;

presetting an injection amount of a liquid injection component, and injecting the electrolyte into a liquid injection scalar component by the liquid injection component, so as to check and adjust the injection amount of the liquid injection component to a preset amount;

grabbing the elements into scanning area of a scanning component with a grabbing component; scanning and recording the identification information of the elements by the scanning component; grabbing the elements and placing them on a sealing component with the grabbing component; injecting some preset amount of the electrolyte into the elements on the sealing component by the liquid injection component;

sealing the elements into a whole by the sealing component to form a button battery;

grabbing the button battery on the sealing component with the grabbing component and placing the button battery in a material-receiving tray;

repeat from the step of "the liquid injection scalar component checking and adjusting the injection amount of the liquid injection component to the preset amount", to the step of "the grabbing component grabbing the button battery to the material-receiving tray".

Further, the elements include anode shells, anode pieces, separators, cathode pieces, and cathode shells.

Further, the step of preparing an electrolyte and a plurality of elements of different specifications includes the following steps:

putting a plurality of anode shells of different specifications into an anode-shell tray;

putting a plurality of anode pieces of different specifications into an anode-piece tray;

putting a plurality of the separators of different specifications into a separator tray;

putting a plurality of cathode pieces of different specifications into a cathode-piece tray;

putting a plurality of cathode shells of different specifications into a cathode-shell tray;

injecting the electrolyte into the liquid injection component.

Further, the step of "grabbing the elements into scanning area of a scanning component with a grabbing component; scanning and recording the identification information of the elements by the scanning component; grabbing the elements and placing them on a sealing component with the grabbing component; injecting some preset amount of the electrolyte into the elements on the sealing component by the liquid injection component" comprises the following steps:

grabbing the anode shell into scanning area of the scanning component with the grabbing component;

scanning and recording the identification information of the anode shell by the scanning component;

grabbing and placing the anode shell that has been scanned on the sealing component with the grabbing component;

grabbing the anode piece into the anode shell on the sealing component with the grabbing component;

grabbing the separator into the anode shell on the sealing component with the grabbing component;

injecting some preset amount of the electrolyte into the anode shell on the sealing component by the liquid injection component;

grabbing the cathode piece into the anode shell on the sealing component with the grabbing component;

grabbing the cathode shell into the anode shell on the sealing component with the grabbing component.

Further, prior to the step of "grabbing the separator into the anode shell on the sealing component with the grabbing component", the method further comprises the following step:

injecting some preset amount of the electrolyte into the anode shell on the sealing component by the liquid injection component.

Further, prior to the step of "grabbing the anode piece", the method further comprises the following step:

grabbing a first spacer and placing the first spacer into the anode shell on the sealing component with the grabbing component; the first spacer is assembled between the anode shell and the anode piece.

Further, prior to the step of "grabbing the cathode shell into the anode shell on the sealing component with the grabbing component", the method further comprises the following step:

grabbing a second spacer and placing the second spacer into the anode shell on the sealing component with the grabbing component; the second spacer is assembled between the cathode shell and the cathode piece.

Further, after the step of "grabbing a second spacer with the grabbing component", the method further comprises the following step:

grabbing a second shrapnel and placing the second shrapnel into the anode shell on the sealing component with the grabbing component; the second shrapnel is assembled between the second spacer and the cathode shell.

Further, the anode piece is made of the same material as the cathode piece.

Further, while the step of "grabbing the elements into scanning area of a scanning component with a grabbing component; scanning and recording the identification information of the elements by the scanning component; grabbing the elements and placing them on a sealing component with the grabbing component; injecting some preset amount of the electrolyte into the elements on the sealing component by the liquid injection component" is being performed, the method further comprises the following steps:

grabbing the elements up above a visual component with the grabbing component;

detecting whether the elements are qualified by the visual component;

if the elements are unqualified, putting the elements into a waste material tray by the grabbing component; if the elements are qualified, grabbing the elements onto the sealing component by the grabbing component.

The automatic batch sample preparation method for button battery provided by the invention has the beneficial effects that compared with the prior art, the present invention first adjusts the injection amount of the liquid injection component, then injects electrolyte into the liquid injection scalar component by the liquid injection component. The liquid injection scalar component weighs the injected electrolyte and compares it with the preset amount. If the injected amount of the liquid injection component is unqualified, the injected amount of the liquid injection component will be readjusted. Until the injected amount of the liquid injection component is equal to the preset amount of the electrolyte, so that the injected electrolyte amount of the assembled button battery can be controlled, and it is convenient to assemble button batteries of different specifications; the invention grabs elements with different specifications to the sealing component for assembly with the grabbing component, and injects a plurality of preset amount of electrolyte into the elements on the sealing component by the liquid injection component so as to assemble the button battery with different specifications in batch, thereby obtains button battery samples with different specifications; the identification information on the elements is scanned and recorded by the scanning component, and then the elements scanned by the scanning component are placed on the sealing component, after the assembly of the button battery is completed, the information recorded by the scanning component can be used to track the production process, specifications, batches and other information, so as to optimize the assembly process of button battery by comparing performances of the assembled button batteries of different specifications; and material-receiving tray is used for the placement of assembled button batteries; the whole assembly process has the advantages of high automation degree, simple operation, assembly precision and high efficiency.

BRIEF DESCRIPTION OF THE DRAWINGS

In order to make the technical solution in the embodiment of the present invention more clear, the embodiments or the drawings used in the description of the prior art will be briefed. It is readily apparent that the following description of the drawings are only for some embodiments of the present invention. For those of ordinary skill in the art, other drawings can be obtained according to these drawings without the exercise of inventive faculty.

In the figures.

1. Baseboard; 2. Button battery; 21. Anode shell; 22. Anode piece; 23. Separator; 24. Cathode piece; 25. Cathode shell; 26. Spacer; 27. Shrapnel; 28. Electrolyte; 3. Liquid injection component; 31. Liquid injection needle; 32. Liquid supply component; 321. Liquid supply tank; 322. Liquid injection pump; 33. Push component; 4. Liquid injection scalar component; 5. Grabbing component; 51. Motion component; 511. First drive beam component; 512. Second drive beam component; 513. Lifting component; 514. Rotating component; 52. Gripper; 6. Sealing component; 7. Visual component; 8. Scanning component; 9. Anode-shell tray; 10. Anode-piece tray; 20. Separator tray; 30. Cathode-piece tray; 40. Cathode-shell tray; 50. Waste material tray; 60. Material-receiving tray; 70. Spacer tray; 80. Shrapnel tray; 90. Accommodating slot.

DETAILED DESCRIPTION OF THE EMBODIMENTS

In order to make the to-be-solved technical problems, technical solutions and beneficial effects of the present invention more clear, the present invention will be described in further detail below with reference to the drawings and embodiments. It should be understood that the specific embodiments described herein are only for the purpose of explaining the present invention and are not intended to limit the present invention.

It should be noted that when an element is referred to as being "fixed" or "disposed" on another element, it may be directly on the other element or indirectly on the other element. When an element is referred to as being "connected" to another element, it may be directly connected to the other element or indirectly connected to the other element.

It should be understood that the terms "length", "width", "upper", "lower", "front", "rear", "left", "right", "vertical", "horizontal", "top", "bottom", "inner", "outer" and the like indicate the orientation or positional relationship based on the orientation or positional relationship shown in the drawings, only for convenience of describing the present invention and simplifying the description, and do not indicate or imply that the said device or element must have a specific orientation, be constructed or operated in a specific orientation, and therefore cannot be understood as a limitation of the present invention.

Furthermore, the terms "first" and "second" are used for descriptive purposes only and cannot be understood as indicating or implying relative importance or implicitly indicating the number of technical features indicated. Thus, a feature defined by "first" or "second" may explicitly or implicitly includes one or more of the features. In the description of the present invention, the meaning of "plurality" is two or more, unless otherwise specifically defined.

Embodiment 1

Referring to FIGS. 1 to 4, a button battery sample preparation device for implementing the automated batch sample preparation method for button battery provided by the embodiment of the present invention will now be described. The automated batch sample preparation device for button battery comprises a sealing component 6, a liquid injection component 3, a grabbing component 5, a scanning component 8 and a liquid injection scalar component 4 for measuring the electrolyte 28.

The grabbing component 5 is used to grab elements of different specifications from the element tray to the sealing component 6, the component tray is provided with a plurality of accommodating slots 90 for the placement of elements of different specifications, and the scanning component 8 is used to identify and record the identification information of the elements, the liquid injection component 3 is used to inject the electrolyte 28 measured by the liquid injection scalar component 4 into the elements on the sealing component 6, the sealing component 6 is used to package the elements on the sealing component 6 as a button battery 2.

Comparing the sample preparation device of automated batch sample preparation method for button battery with the prior art, the element tray is used for the placement of elements with different specifications, the grabbing component 5 is used to grab elements of different specifications from the element tray onto the sealing component 6, and the scanning component 8 is used to scan and record the identification information of the elements, the liquid injection component 3 is used to inject electrolyte 28 into elements on the sealing component 6, the liquid injection scalar component 4 is used to measure the electrolyte 28 to check the injection amount of the liquid injection component 3, and the sealing component 6 is used to package the elements as a whole to form button battery 2. It has simple structure, high degree of automation, high assembly efficiency and precision, and can mass-produce button battery 2 of different specifications. For the step of grabbing the elements, first scanning and recording the identification information of the elements by the scanning component 8, then placing the elements on the sealing component 6, after packaging the button battery 2 by the sealing component 6, recording the identification information of each element by the scanning component 8, so the production batch, specification, process and other information of each assembled button battery 2 are obtained, and then the performances of button battery 2 are compared so as to optimize the assembly process of button battery 2. The present invention can quickly assemble many button batteries 2 with different specifications, the assembly efficiency is high; the injection amount of the liquid injection component 3 can be conveniently controlled through measuring the electrolyte 28 by the liquid injection scalar component 4, thereby button batteries 2 of the same or different amount of the electrolyte 28 can be assembled.

Figure 1:
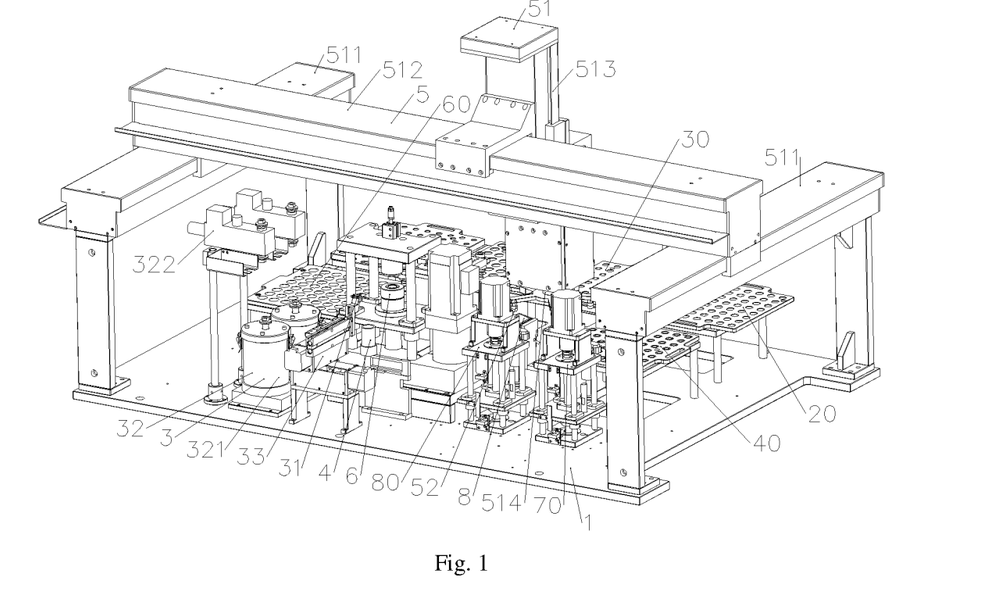
FIG. 1 is a structural schematic diagram of a button battery sample preparation device for implementing the automated batch sample preparation method for button battery provided by the embodiment of the present invention.

Specifically, referring to FIG. 1, the front-back direction in the new embodiment is the same as the length direction of the first drive beam component 511, the left-right direction is the same as the length direction of the second drive beam component 512, and the up-down direction is the same as the vertical direction.

Figure 2:
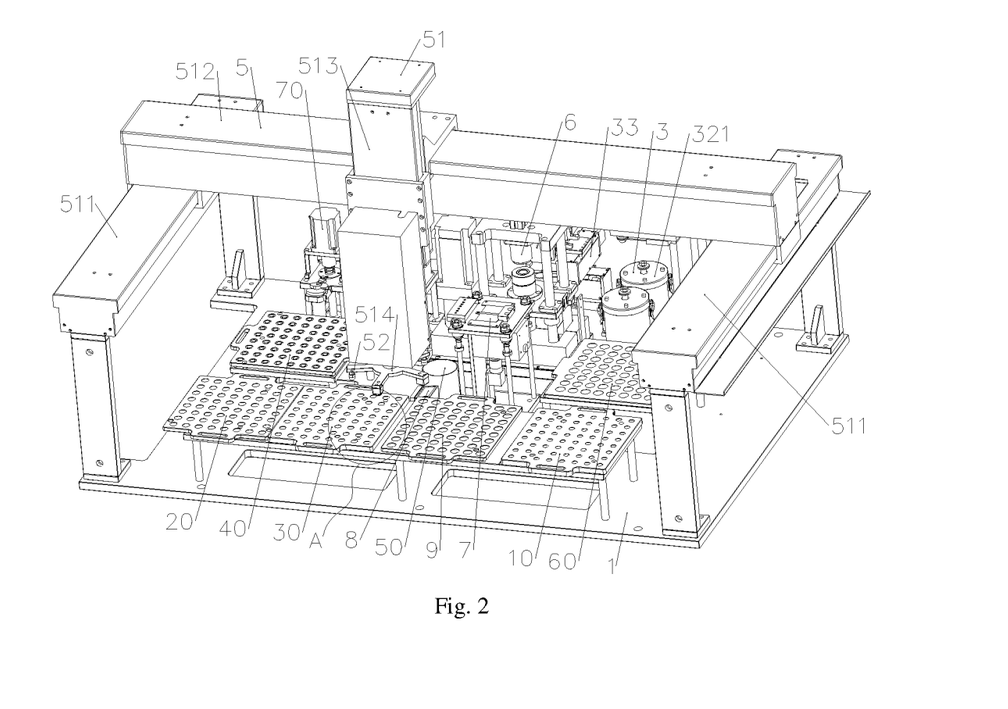
FIG. 2 is an another structural schematic diagram of a button battery sample preparation device for implementing the automated batch sample preparation method for button battery provided by the embodiment of the present invention.
Figure 3:
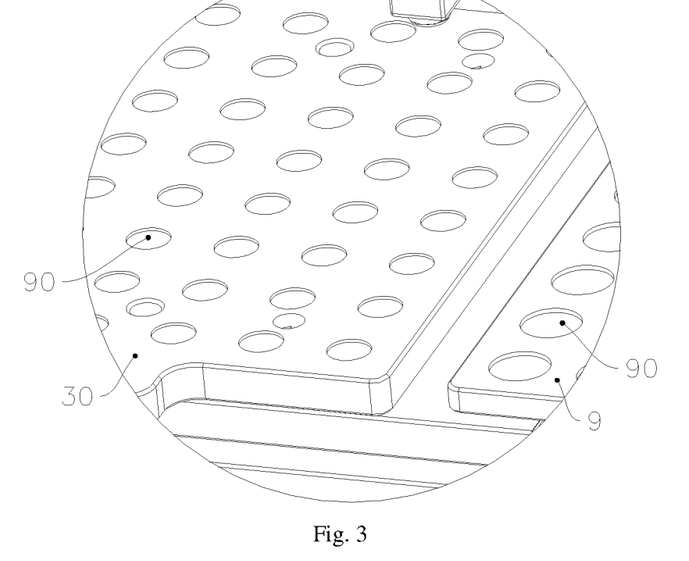
FIG. 3 is an enlarged view of A in FIG. 2.
Figure 4:
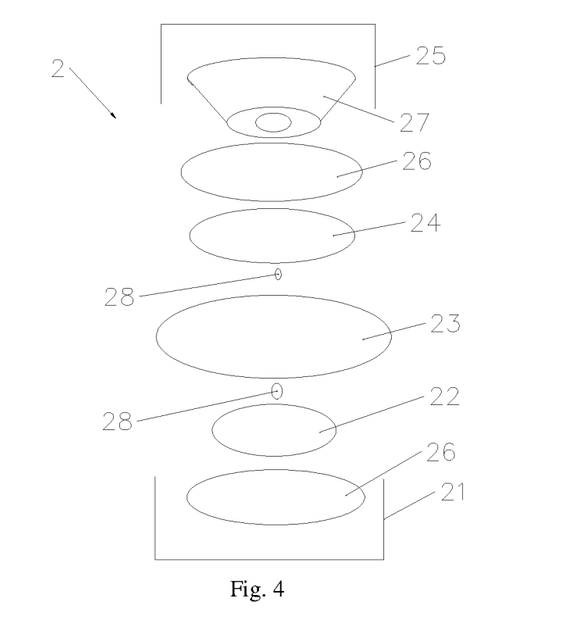
FIG. 4 is an exploded view of a button battery assembled by the automated batch sample preparation method for button battery according to an embodiment of the present invention.

Referring to FIG. 2 and FIG. 4, the elements include anode shells 21, anode pieces 22, separators 23, cathode pieces 24 and cathode shells 25;

The element trays includes an anode-shell tray 9 for placing anode shells 21, an anode-piece tray 10 for placing anode pieces 22, a separator tray 20 for placing separators 23, a cathode-piece tray 30 for placing cathode pieces 24 and a cathode-shell tray 40 for placing cathode shell 25, so that the grabbing component 5 can continuously grab different specifications of anode shells 21, anode pieces 22, separators 23, cathode pieces 24 and cathode shells 25 from the anode-shell tray 9, anode-piece tray 10, separator tray 20, cathode-piece tray 30 and cathode-shell tray 40 to the sealing component 6, so as to improve the assembly efficiency of button battery 2, the button battery 2 of different specifications can be assembled in batch, and samples of button battery 2 can be formed so that the assembly process can be optimized.

Referring to FIGS. 2 and 4, the grabbing component 5 is also used for grabbing the assembled button battery 2, the grabbing component 5 comprises multiple grippers 52 and a motion component 51 for driving the grippers 52 to move. Each gripper 52 can grab one or more of the anode shells 21, anode pieces 22, separators 23, cathode pieces 24, cathode shells 25 and button batteries 2. When the gripper 52 grasps an element or a button battery 2, the fitting degree and stability of the gripper 52 grasping the elements or the button battery 2 can be improved, so as to avoid the structure of the gripper 52 from being complicated for grabbing multiple elements or button batteries 2 at one time; when the gripper 52 grabs multiple elements at one time, the number of grippers 52 can be reduced, so the production cost and the installation space can both be saved, and the structure of the grabbing component 5 can be simplified.

Referring to FIGS. 1 and 2, the motion component 51 includes a first drive beam component 511, a second drive beam component 512, a lifting component 513, and a rotating component 514. The first drive beam component 511 is used to drive the second drive beam component 512 to move in the front-back direction, and the second drive beam component 512 is used to drive the lifting component 513 to move in the left-right direction, the lifting component 513 is used to drive the rotating component 514 to move up and down, and the rotating component 514 is used to drive the gripper 52 to rotate in a horizontal plane, so as to drive the gripper 52 to move in a three-dimensional space by the motion component 51. Therefore, it is convenient to accurately grab the anode shell 21, anode shell 22, separator 23, cathode piece 24, cathode shell 25 and button battery 2.

Specifically, referring to FIG. 2, all grippers 52 are evenly distributed along the same circumferential direction in the horizontal plane, all grippers 52 are fixedly connected with the rotating shaft of the rotating component 514, so as to prevent the grippers 52 from interfering with each other when grabbing the anode shell 21, anode shell 22, separator 23, cathode piece 24, cathode shell 25 or button battery 2, the rotating component 514 can also simplify the motion path of the gripper 52.

Specifically, the grippers 52 are detachably connected to the output shaft of the rotating component 514, so that specific corresponding gripper 52 can be replaced conveniently according to the target element to be grabbed by the gripper 52.

Specifically, gripper 52 can be a suction cup.

Referring to FIGS. 1 and 4, it also includes a spacer tray 70 for the placement of spacers 26, and the grabbing component 5 is also used for grabbing spacer 26;

the grabbing component 5 can grab the spacer 26 on the spacer tray 70 into the anode shell 21 on the sealing component 6, so as to assemble spacer 26 between the anode shell 21 and the anode piece 22 to form a first spacer or/and between the cathode piece 24 and the cathode shell 25 to form a second spacer. According to the different models of button battery 2, the spacer 26 can be placed between the anode shell 21 and the anode piece 22 to form a first spacer; the spacer 26 can be placed between the cathode piece 24 and the cathode shell 25 to form a second spacer.

Referring to FIGS. 1 and 4, it further includes a shrapnel tray 80 for the placement of shrapnel 27, and the grabbing component 5 is also used for grabbing the shrapnel 27;

the grabbing component 5 can grab shrapnel 27 on the shrapnel tray 80 into the anode shell 21 on sealing component 6, so as to assemble the shrapnel 27 between the anode shell 21 and the first spacer or/and between the cathode shell 25 and the second spacer. According to the different models of button battery 2, the shrapnel 27 can be placed between the anode shell 21 and the first spacer to form the first shrapnel; the shrapnel 27 is placed between the cathode shell 25 and the second spacer to form a second shrapnel.

Referring to FIGS. 2 and 4, a visual component 7 is also included to detect whether the elements are qualified, so as to prevent unqualified elements from being assembled into button battery 2, which could affect the quality of button battery 2 and reduce the yield of button battery 2.

Referring to FIGS. 2 and 4, it also includes a waste material tray 50 for collecting unqualified elements, so as to recycle the unqualified elements and keep the environment clean in the assembly process of button battery 2.

In particular, a plurality of waste material tray 50 may be provided for collecting different elements separately to facilitate recycling.

Referring to FIGS. 2 and 4, it also includes a material-receiving tray 60 for the placement of the button battery 2, so as to facilitate collection of assembled button battery 2 samples and improve the efficiency of removing the button battery 2.

Referring to FIGS. 1, 2 and 4, the liquid injection component 3 includes a liquid injection component 31, a liquid supply component 32, and a push component 33 for driving the liquid injection needle 31 toward the sealing component 6, the electrolyte 28 in the liquid supply component 32 can be injected into elements through the liquid injection needle 31, so as to set the positions for the liquid supply component 32 and the liquid injection needle 31 separately, so that the setting positions of the liquid supply component 32 and the liquid supply needle 31 can be reasonably planed, and the liquid injection needle 31 can be driven to move by the push component 33, thereby improving the injection accuracy of the liquid injection component 3.

Specifically, referring to FIG. 1, the liquid supply component 32 includes a liquid supply tank 321 and a liquid injection pump 322, the liquid injection pump 322 is used for supplying the electrolyte 28 in the liquid supply tank 321 to the liquid injection needle 31. The liquid supply tank 321, liquid injection pump 322 and liquid injection needle 31 are connected through hoses.

Referring to FIGS. 1 and 2, it also includes a baseboard 1, and the sealing component 6, liquid injection component 3, grabbing component 5, liquid injection scalar component 4, anode-shell tray 9, anode-piece tray 10, spacer tray 70, shrapnel tray 80, separator tray 20, cathode-piece tray 30, cathode-shell tray 40 and waste material tray 50 are all disposed on the baseboard 1.

Embodiment 2

Figure 5:
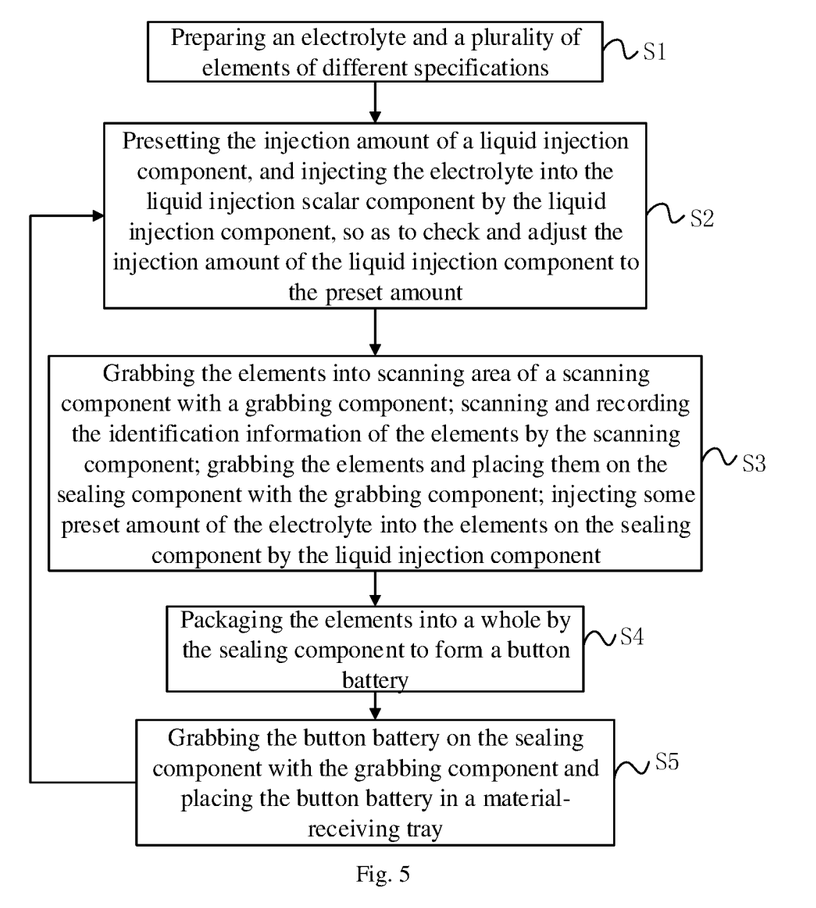
FIG. 5 is a flowchart of the automated batch sample preparation method for button battery provided by an embodiment of the present invention.

Referring to FIGS. 1, 2, 4 and 5, the automated batch sample preparation method for button battery provided by the present invention will now be described. The automated batch sample preparation method for button battery includes the following steps:

S1: Preparing an electrolyte 28 and a plurality of elements of different specifications;

S2: Presetting the injection amount of a liquid injection component 3, and injecting the electrolyte 28 into the liquid injection scalar component 4 by the liquid injection component 3, so as to check and adjust the injection amount of the liquid injection component 3 to the preset amount;

S3: Grabbing the elements into scanning area of a scanning component 8 with a grabbing component 5; scanning and recording the identification information of the elements by the scanning component 8; grabbing the elements and placing them on the sealing component 6 with the grabbing component 5; injecting some preset amount of the electrolyte 28 into the elements on the sealing component 6 by the liquid injection component 3.

S4: Packaging the elements into a whole by the sealing component 6 to form a button battery 2;

S5: Grabbing the button battery 2 on the sealing component 6 with the grabbing component 5 and placing the button battery 2 in a material-receiving tray 60;

Repeat from step S2 to step S5.

The automatic batch sample preparation method for button battery provided by the invention has the beneficial effects that compared with the prior art, the present invention first adjusts the injection amount of the liquid injection component 3, then injects electrolyte 28 into the liquid injection scalar component 4 by the liquid injection component 3. The liquid injection scalar component 4 weighs the injected electrolyte 28 and compares it with the preset amount. If the injected amount of the liquid injection component 3 is unqualified, the injected amount of the liquid injection component 3 will be readjusted. Until the injected amount of the liquid injection component 3 is equal to the preset amount of the electrolyte 28, so that the injected electrolyte amount of the assembled button battery 2 can be controlled, and it is convenient to assemble button batteries 2 of different specifications; the invention grabs elements with different specifications to the sealing component 6 for assembly with the grabbing component 5, and injects a plurality of preset amount of electrolyte 28 into the elements on the sealing component 6 by the liquid injection component 3 so as to assemble the button battery 2 with different specifications in batch, thereby obtains button battery samples with different specifications; the identification information on the elements is scanned and recorded by the scanning component 8, and then the elements scanned by the scanning component are placed on the sealing component 6, after the assembly of the button battery 2 is completed, the information recorded by the scanning component 8 can be used to track the production process, specifications, batches and other information, so as to optimize the assembly process of button battery 2 by comparing performances of the assembled button batteries of different specifications; and material-receiving tray 60 is used for the placement of assembled button batteries 2; the whole assembly process has the advantages of high automation degree, simple operation, assembly precision and high efficiency.

Specifically, there is no sequence between step S1 and step S2.

Referring to FIGS. 1, 4 and 5, step S1 specifically includes the following steps:

S11: Putting a plurality of anode shells 21 of different specifications into an anode-shell tray 9;

S12: Putting a plurality of anode pieces 22 of different specifications into an anode-piece tray 10;

S13: Putting a plurality of the separators 23 of different specifications into a separator tray 20;

S14: Putting a plurality of cathode pieces 24 of different specifications into a cathode-piece tray 30;

S15: Putting a plurality of cathode shells 25 of different specifications into a cathode-shell tray 40;

S16: Injecting the electrolyte 28 into the liquid injection component 3.

So that the grabbing component 5 can quickly grab elements of different specifications, the assembly efficiency of button batteries 2 of different specifications can be improved. Therefore, the assembly process of button battery 2 can be optimized by comparing the performances of the assembled button batteries 2 of different specifications.

Specifically, there is no sequence among steps S11, S12, S13, S14, S15 and S16.

Figure 6:
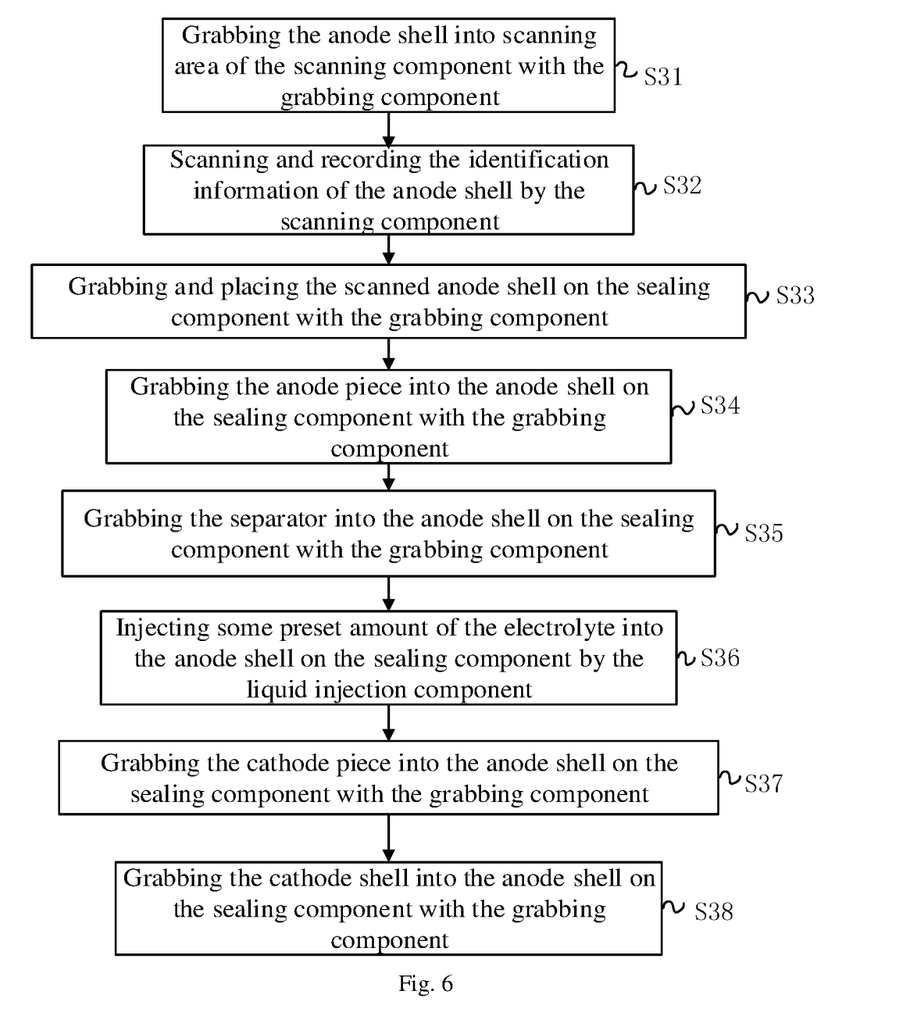
FIG. 6 is a flowchart of specific implementation steps of S3 in FIG. 5.

Referring to FIGS. 2, 4 and 6, step S3 specifically includes the following steps:

S31: Grabbing the anode shell 21 into scanning area of the scanning component 8 with the grabbing component 5;

S32: Scanning and recording the identification information of the anode shell 21 by the scanning component 8;

S33: Grabbing and placing the scanned anode shell 21 on the sealing component 6 with the grabbing component 5;

S34: Grabbing the anode piece 22 into the anode shell 21 on the sealing component 6 with the grabbing component 5;

S35: Grabbing the separator 23 into the anode shell 21 on the sealing component 6 with the grabbing component 5;

S36: Injecting some preset amount of the electrolyte 28 into the anode shell 21 on the sealing component 6 by the liquid injection component 3;

S37: Grabbing the cathode piece 24 into the anode shell 21 on the sealing component 6 with the grabbing component 5;

S38: Grabbing the cathode shell 25 into the anode shell 21 on the sealing component 6 with the grabbing component 5.

The assembled button battery 2 can be identified simply by scanning the identification information of the anode shell 21, thereby improving the assembly efficiency of button battery 2. Also, the assembly efficiency is improved by the grabbing component 5 grabbing each element.

Referring to FIGS. 2, 4 and 6, prior to step S35, the method further includes the following steps:

S341: Injecting some preset amount of the electrolyte 28 into the anode shell 21 on the sealing component 6 by the liquid injection component 3.

The electrolyte 28 is injected into the anode shell 21 on the sealing component 6 twice by the liquid injection component 3, which facilitates the anode piece 22 and cathode piece 24 to be infiltrated with the electrolyte 28, so as to improve the infiltration degree of the anode piece 22 and cathode piece 24, thereby improving the performance of button battery 2.

Referring to FIGS. 1 and 4, prior to step S34, the method further includes the following steps:

S6: Grabbing a first spacer and placing the first spacer into the anode shell 21 on the sealing component 6 with the grabbing component 5; the first spacer is assembled between the anode shell 21 and the anode piece 22.

The first spacer can fill the gap between the assembled anode shell 21 and cathode shell 25, so as to improve the yield of button battery 2, and prevent the elements such as the anode piece 22, separator 23, cathode piece 24 from moving in the gap between the anode shell 21 and cathode shell 25 to affect the quality of button battery 2.

Referring to FIGS. 1 and 4, prior to step S36, the method further includes the following steps:

S7: Grabbing a first shrapnel and placing the first shrapnel into the anode shell 21 on the sealing component 6 with the grabbing component 5; the first shrapnel is assembled between the anode shell 21 and the first spacer.

The first shrapnel can fill the gap between the assembled anode shell 21 and cathode shell 25, so as to improve the yield of button battery 2, and prevent the elements such as the anode piece 22, separator 23, cathode piece 24 from moving in the gap between the anode shell 21 and cathode shell 25 to affect the quality of button battery 2.

Referring to FIGS. 1 and 4, prior to step S38, the method further includes the following steps:

S8: Grabbing a second spacer and placing the second spacer into the anode shell 21 on the sealing component with the grabbing component 5; the second spacer is assembled between the cathode shell 25 and the cathode piece 24.

The second spacer can fill the gap between the assembled anode shell 21 and cathode shell 25, so as to improve the yield of button battery 2, and prevent the elements such as the anode piece 22, separator 23, cathode piece 24 from moving in the gap between the anode shell 21 and cathode shell 25 to affect the quality of button battery 2.

Referring to FIGS. 1 and 4, prior to step S8, the method further includes the following steps:

S9: Grabbing the second shrapnel and placing the second shrapnel into the anode shell 21 on the sealing component 6 with the grabbing component 5; the second shrapnel is assembled between the second spacer and the cathode shell 25.

The second shrapnel can fill the gap between the assembled anode shell 21 and cathode shell 25, so as to improve the yield of button battery 2, and prevent the elements such as the anode piece 22, separator 23, cathode piece 24 from moving in the gap between the anode shell 21 and cathode shell 25 to affect the quality of button battery 2.

Specifically, the first spacer, second spacer, first shrapnel and second shrapnel are all used for filling in the gap between the anode shell 21 and the cathode shell 25 of the assembled button battery 2, so as to prevent the quality of the button battery 2 from being damaged by the gaps existing in the assembled button battery 2. Users can select the first spacer, second spacer, first shrapnel or second shrapnel for assembly according to the model of button battery 2.

The anode piece 22 is made of the same material as the cathode piece 24, so as to facilitate the control of variables when comparing the performance of the assembled button battery 2 of different specifications, thus optimizing the process by analyzing the performance of button battery samples.

Specifically, both anode piece 22 and cathode piece 24 are lithium sheets, which can be used as both anode and cathode materials.

Referring to FIGS. 1, 4 and 5, when step S3 is performed, the method further includes the following steps:

S39: Grabbing the elements up above a visual component with the grabbing component;

S310: Detecting whether the elements are qualified by Visual Component 7;

S320: If the elements are unqualified, putting the elements into a waste material tray 50 by the grabbing component 5; if the elements are qualified, grabbing the elements on the sealing component 6 by the grabbing component 5.

Detecting whether the elements are qualified by the visual component 7 can improve the yield of the assembled button battery 2, so as to prevent the quality of the button battery 2 from being reduced, which could result in defective products in the assembled button battery 2.

Specifically, in this embodiment, the anode shell 21 and the cathode shell 25 are allowed to have minor defects, therefore the visual component 7 is used to detect whether the anode piece 22, separator 23 and cathode piece 24 are qualified to improve the assembly efficiency of the button battery 2.

The above descriptions are only preferred embodiments of the present invention and are not intended to limit the present invention. Any modification, equivalent substitution and improvement made within the spirit and principles of the present invention shall be included within the scope of protection of the present invention.

What is claimed is:

1. An automated batch sample preparation method for button battery, comprising the following steps:
   preparing an electrolyte and a plurality of elements of different specifications;
   presetting an injection amount of a liquid injection component, and injecting the electrolyte into a liquid injection scalar component by the liquid injection component, so as to check and adjust the injection amount of the liquid injection component to a preset amount;
   grabbing the elements into scanning area of a scanning component with a grabbing component; scanning and recording the identification information of the elements by the scanning component; grabbing the elements and placing them on a sealing component with the grabbing component; injecting some preset amount of the electrolyte into the elements on the sealing component by the liquid injection component;
   sealing the elements into a whole by the sealing component to form a button battery;
   grabbing the button battery on the sealing component with the grabbing component and placing the button battery in a material-receiving tray;
   repeat from the step of the liquid injection scalar component checking and adjusting the injection amount of the liquid injection component to the preset amount, to the step of the grabbing component grabbing the button battery to the material-receiving tray.

2. The automated batch sample preparation method for button battery of claim 1, wherein the elements include anode shells, anode pieces, separators, cathode pieces, and cathode shells.

3. The automated batch sample preparation method for button battery of claim 2, wherein the step of preparing an electrolyte and a plurality of elements of different specifications comprises the following steps:
   putting a plurality of anode shells of different specifications into an anode-shell tray;
   putting a plurality of anode pieces of different specifications into an anode-piece tray;
   putting a plurality of the separators of different specifications into a separator tray;
   putting a plurality of cathode pieces of different specifications into a cathode-piece tray;
   putting a plurality of cathode shells of different specifications into a cathode-shell tray;
   injecting the electrolyte into the liquid injection component.

4. The automated batch sample preparation method for button battery of claim 2, wherein the step of grabbing the elements into scanning area of a scanning component with a grabbing component; scanning and recording the identification information of the elements by the scanning component; grabbing the elements and placing them on a sealing component with the grabbing component; injecting some preset amount of the electrolyte into the elements on the sealing component by the liquid injection component comprises the following steps:
   grabbing the anode shell into scanning area of the scanning component with the grabbing component;
   scanning and recording the identification information of the anode shell by the scanning component;
   grabbing and placing the anode shell that has been scanned on the sealing component with the grabbing component;
   grabbing the anode piece into the anode shell on the sealing component with the grabbing component;
   grabbing the separator into the anode shell on the sealing component with the grabbing component;
   injecting some preset amount of the electrolyte into the anode shell on the sealing component by the liquid injection component;
   grabbing the cathode piece into the anode shell on the sealing component with the grabbing component;
   grabbing the cathode shell into the anode shell on the sealing component with the grabbing component.

5. The automated batch sample preparation method for button battery of claim 4, wherein prior to the step of grabbing the separator into the anode shell on the sealing component with the grabbing component, the method further comprises the following step:
   injecting some preset amount of the electrolyte into the anode shell on the sealing component by the liquid injection component.

6. The automated batch sample preparation method for button battery of claim 4, wherein prior to the step of grabbing the anode piece, the method further comprises the following step:
   grabbing a first spacer and placing the first spacer into the anode shell on the sealing component with the grabbing component; the first spacer is assembled between the anode shell and the anode piece.

7. The automated batch sample preparation method for button battery of claim 4, wherein prior to the step of grabbing the cathode shell into the anode shell on the sealing component with the grabbing component, the method further comprises the following step:
   grabbing a second spacer and placing the second spacer into the anode shell on the sealing component with the grabbing component; the second spacer is assembled between the cathode shell and the cathode piece.

8. The automated batch sample preparation method for button battery of claim 7, wherein after the step of grabbing a second spacer with the grabbing component, the method further comprises the following step:

grabbing a second shrapnel and placing the second shrapnel into the anode shell on the sealing component with the grabbing component; the second shrapnel is assembled between the second spacer and the cathode shell.

9. The automated batch sample preparation method for button battery of claim 2, wherein the anode piece is made of the same material as the cathode piece.

10. The automated batch sample preparation method for button battery of claim 1, wherein while the step of grabbing the elements into scanning area of a scanning component with a grabbing component; scanning and recording the identification information of the elements by the scanning component; grabbing the elements and placing them on a sealing component with the grabbing component; injecting some preset amount of the electrolyte into the elements on the sealing component by the liquid injection component is being performed, the method further comprises the following steps:

grabbing the elements up above a visual component with the grabbing component;

detecting whether the elements are qualified by the visual component;

if the elements are unqualified, putting the elements into a waste material tray by the grabbing component; if the elements are qualified, grabbing the elements onto the sealing component by the grabbing component.

\* \* \* \* \*